3,301,655
METHOD FOR INHIBITING GERMINATION AND PRE-EMERGENT GROWTH OF GRASS

Robert E. Wann, Manhattan, Kans., and Henry C. Godt, Jr., St. Louis, Mo., assignors to Monsanto Company, a corporation of Delaware
No Drawing. Original application Aug. 2, 1960, Ser. No. 46,902. Divided and this application Feb. 11, 1963, Ser. No. 257,742
5 Claims. (Cl. 71—2.6)

This application is a division of application Serial No. 46,902, filed August 2, 1960, now abandoned.

This invention relates to new and useful N-substituted tolylacetamides. Additionally this invention relates to methods of inhibiting the germination of grass seeds and the pre-emergence growth thereof in contact with soil.

The N-substituted tolylacetamides of this invention can be represented by the structure

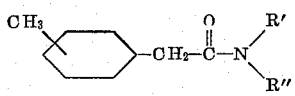

wherein R' is hydrogen or lower aliphatic hydrocarbon radical and wherein R" is a lower aliphatic hydrocarbon radical. By the expression "lower aliphatic hydrocarbon radical" is meant to include methyl, ethyl, propyl, allyl, propargyl, butyl, butenyl, butynyl, and the various isomeric forms thereof containing less than 5 carbon atoms. By the expression "tolylacetamides" is meant to include 2 - (o - tolyl)acetamides, 2 - (m - tolyl)acetamides, 2-(p-tolyl)acetamides and mixtures thereof. Of the N-substituted tolylacetamides of this invention the N-substituted 2-(o-tolyl)acetamides and the N-substituted 2-(m-tolyl)acetamides, particularly the latter, are preferred. In general it is preferred that R' and R" be like or unlike aliphatic hydrocarbon radicals containing from 1 to 3 carbon atoms, and it is particularly preferred that R' and R" be methyl radicals.

The N-substituted tolylacetamides of this invention can be prepared by reacting a tolylacetyl chloride (or mixture of tolylacetyl chlorides) of the structure

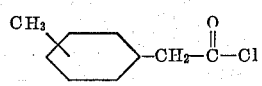

with an amine of the structure R'—NH—R" in the presence of a hydrogen chloride scavenging agent in an amount sufficient to absorb the hydrogen chloride by-product. The scavenging agent can be added at the beginning of the reaction or throughout the course of the reaction. Among the scavenging agents which can be employed are sodium carbonate, potassium carbonate, triethylamine, tributylamine, dimethylaniline, pyridine, lutidine, or an excess of the aforedescribed amine reactant or any mixture thereof. The reaction is preferably carried out at a temperature above the freezing point of the system and up to about 20° C. When desired an inert organic solvent (e.g. diethyl ether, carbon tetrachloride, ethylene dichloride, etc.) can be employed.

As illustrative of the method of making the compounds of this invention is the following:

EXAMPLE I 18.0 parts by weight of m-tolylacetyl chloride is added dropwise to a chilled (about 0° C.) solution of 18.0 parts by weight of dimethylamine in approximately 144 parts by weight of diethyl ether while agitating the solution. During the addition the reaction mass is maintained at about 0° C. Upon completion of the chloride addition, the reaction mass is agitated at room temperature for about sixteen hours. Thereafter approximately 100 parts by weight of water is intimately mixed with the reaction mass. The phases are permitted to separate and the organic layer is withdrawn and washed with two 100 parts by weight portions of water. The so-washed organic layer is then dried over anhydrous magnesium sulfate. The ether is then evaporated and the liquid residue is fractionally distilled at reduced pressure. The fraction (11.6 parts by weight of a yellow liquid) boiling at 102.5–105° C. at 0.55 mm. is N,N-dimethyl-2-(m-tolyl) acetamide, $n_D^{25}=1.5363$.

EXAMPLE II

Employing the procedure of Example I but replacing dimethylamine with an equimolar amount of methylamine there is obtained N-methyl 2-(m-tolyl)acetamide. a yellow liquid, B.P. 130–131° C. at 0.8 mm.

EXAMPLE III

Employing the procedure of Example I but replacing dimethylamine with an equimolar amount of ethylamine there is obtained N-ethyl 2-(m-tolyl)acetamide, a yellow liquid, B.P. 134–135° C. at 1.1 mm.

EXAMPLE IV

Employing the procedure of Example I but replacing dimethylamine with an equimolar amount of butylamine there is obtained N-butyl 2-(m-tolyl)acetamide, a yellow liquid, B.P. 149–150° C. at 0.95 mm.

EXAMPLE V

Employing the procedure of Example I but replacing dimethylamine with an equimolar amount of diethylamine there is obtained N,N-diethyl 2-(m-tolyl)acetamide, a yellow liquid, B.P. 127–129° C. at 1.6 mm.

EXAMPLE VI

Employing the procedure of Example I but replacing dimethylamine with an equimolar amount of diallylamine there is obtained N,N-diallyl 2-(m-tolyl)acetamide, a yellow liquid, B.P. 126.5° C. at 0.6 mm.

EXAMPLE VII 18.0 parts by weight of o-tolylacetyl chloride is added dropwise to a chilled (about 0° C.) solution of 18.0 parts by weight of dimethylamine in approximately 144 parts by weight of diethyl ether while agitating the solution. During the addition the reaction mass is maintained at about 0° C. Upon completion of the chloride addition, the reaction mass is agitated at room temperature for about sixteen hours. Thereafter approximately 100 parts by weight of water is intimately mixed with the reaction mass. The phases are permitted to separate and the organic layer is withdrawn and washed with two 100 parts by weight portions of water. The so-washed organic layer is then dried over anhydrous magnesium sulfate. The ether is then evaporated. The white solid residue is N,N-dimethyl 2-(o-tolyl)acetamide, melting at 50–51° C.

EXAMPLE VIII 18.0 parts by weight of o-tolylacetyl chloride is added dropwise to a chilled (about 10° C.) solution of 29.2 parts by weight of diethylamine in approximately 144 parts by weight of diethyl ether while agitating the solution. During the addition the reaction mass is maintained at about 10° C. Upon completion of the chloride addition, the reaction mass is agitated at room temperature for about sixteen hours. Thereafter approximately 100 parts by weight of water is intimately mixed with the reaction mass. The phases are permitted to separate and the organic layer is withdrawn and washed with two 100 parts by weight portions of water. The so-washed organic layer is dried over anhydrous magnesium sulfate. The ether is then evaporated and the liquid residue is fractionally distilled at reduced pressure. The fraction, boiling at 110.5–112.5° C. at 0.42 mm. is N,N-diethyl 2-(o-tolyl)acetamide, a yellow liquid.

EXAMPLE IX

Employing the procedure of Example VIII but replacing diethylamine with an equimolar amount of diallylamine there is obtained N,N-diallyl 2-(o-tolyl)acetamide, a yellow liquid, B.P. 119–121.5° C. at 0.25 mm.

EXAMPLE X

Employing the procedure of Example VII but replacing o-tolylacetyl chloride with an equimolar amount of p-tolylacetyl chloride there is obtained as a white solid N,N-dimethyl 2-(p-tolyl)acetamide, M.P. 23–24° C.

EXAMPLE XI

Employing the procedure of Example VII but replacing o-tolylacetyl chloride with an equimolar amount of p-tolylacetyl chloride and replacing dimethylamine with an equimolar amount of butylamine there is obtained as a white solid N-butyl 2-(p-tolyl) acetamide, M.P. 81–82.5 °C.

EXAMPLE XII

Employing the procedure of Example VIII but replacing o-tolylacetyl chloride with an equimolar amount of p-tolylacetyl chloride there is obtained N,N-diethyl 2-(p-tolyl)acetamide, a yellow liquid, B.P. 112–113° C. at 0.35 mm.

EXAMPLE XIII

Employing the procedure of Example VIII but replacing o-tolylacetyl chloride with an equimolar amount of p-tolylacetyl chloride and replacing diethylamine with an equimolar amount of diallylamine there is obtained N,N-diallyl 2 - (p-tolyl)acetamide a yellow liquid, B.P. 125–125.5° C. at 0.3 mm.

EXAMPLE A

Employing the procedure of Example VIII but replacing o-tolylacetyl chloride with an equimolar amount of phenylacetyl chloride there is obtained N,N-diethyl 2-(phenyl)acetamide, a colorless liquid, B.P. 105–106° C. at 0.53 mm., $n_D^{25}=1.5214$.

The N-substituted tolylacetamides of this invention are useful for selectively inhibiting the germination and pre-emergent growth of grasses from seeds in contact with soil and to illustrate their relative activity is the following test procedure.

Seeds of several different plants (itemized hereinafter) each representing a principal botanical species are planted in aluminum pans 9½" x 5¼" x 2¾"). A good grade of top soil which has been treated with 0.05% of a soil conditioner ("Krillium") is compacted to a depth of ⅜" from the top of the pan. The grass seeds are scattered randomly over one-half of the soil surface and the broad-leaf seeds are scattered randomly over the remaining one-half of the soil surface. The seeds are then covered with ⅜" of the prepared soil mixture and the pan leveled.

The levelled surface of the soil in the pan is then sprayed with 15 cc. of acetone containing the test compound dissolved therein at a definite rate in lbs. per acre.

After spraying the soil surface, the pan is placed in a sand bench and ½" of water added to the bench. The soil absorbs moisture through perforations in the bottom until the soil surface is about one-half moist, by which time the excess water in the sand bench is drained off. The remaining soil surface is moistened by capillary action.

Fourteen days after application of the test compound the results are observed and recorded. The number of plants of each species which germinated and grew are counted and converted to a herbicidal rating by means of a fixed scale based on average percent germination. (Germination rates are established for all new seed lots and periodic checks run on old seed in current use). The scale used is as follows:

*Herbicidal rating—Conversion scale*

| Percent Germination, Control | 3 | 2 | 1 | 0 |
|---|---|---|---|---|
| 100 | 0–5 | 6–10 | 11–15 | 16–20 |
| 90 | 0–5 | 6–9 | 10–13 | 14–20 |
| 80 | 0–4 | 5–8 | 9–12 | 13–20 |
| 70 | 0–4 | 5–7 | 8–11 | 12–20 |
| 60 | 0–3 | 4–6 | 7–9 | 10–20 |
| 50 | 0–3 | 4–5 | 6–8 | 9–20 |
| 40 | 0–2 | 3–4 | 5–6 | 7–20 |
| Corn | 0–1 | 2 | 3 | 4–5 |

The relative value of each test compound with respect to its herbicidal effect on each plant is indicated by a number as follows:

0—No phytotoxicity
1—Slight phytotoxicity
2—Moderate phytotoxicity
3—Severe phytotoxicity In the following tables of herbicidal evaluation the test compounds are represented by code letters as follows:

| Test compound: | Code |
|---|---|
| N-butyl 2-(p-tolyl)acetamide | A |
| N,N-dimethyl 2-(p-tolyl)acetamide | B |
| N,N-diethyl 2-(p-tolyl)acetamide | C |
| N,N-diallyl 2-(p-tolyl)acetamide | D |
| N,N-dimethyl 2-(o-tolyl)acetamide | E |
| N,N-diethyl 2-(o-tolyl)acetamide | F |
| N,N-diallyl 2-(o-tolyl)acetamide | G |
| N-methyl 2-(m-tolyl)acetamide | H |
| N-ethyl 2-(m-tolyl)acetamide | I |
| N-butyl 2-(m-tolyl)acetamide | J |
| N,N-dimethyl 2-(m-tolyl)acetamide | K |
| N,N-diethyl 2-(m-tolyl)acetamide | L |
| N,N-diallyl 2-(m-tolyl)acetamide | M |
| 2-(m-tolyl)acetamide | N |
| 2-(m-tolyl)acetic acid | O |
| 2-(phenyl)acetamide | P |
| N,N-diethyl 2-(phenyl)acetamide | Q |

Table I illustrates the phytotoxic effect obtained upon applying the test compound at a rate of 25 lbs. per acre while Table II illustrates the phytotoxic effect obtained upon applying the test compound at a rate of 5 lbs. per acre.

TABLE I.—EXTENT [1] OF PHYTOTOXICITY EMPLOYING COMPOUND

| Plant | A | B | C | D | E | F | G | H | I | J | K | L | M | N | O | P |
|---|---|---|---|---|---|---|---|---|---|---|---|---|---|---|---|---|
| Morning Glory | 3 | 1 | 0 | 1 | 1 | 3 | 0 | 0 | 2 | 1 | 1 | 0 | 0 | 0 | 0 | 0 |
| Wild Oat | 0 | 3 | 1 | 2 | 3 | 3 | 3 | 2 | 3 | 0 | 3 | 1 | 3 | 0 | 0 | 0 |
| Brome Grass | 1 | 2 | 2 | 1 | 3 | 3 | 3 |   |   | 1 | 3 |   | 2 | 0 | 0 | 0 |
| Rye Grass | 1 | 3 | 3 | 3 | 3 | 3 | 3 | 2 | 3 | 1 | 3 | 3 | 3 | 0 | 0 | 0 |
| Radish | 0 | 1 | 0 | 0 | 1 | 2 | 3 | 0 | 2 | 0 | 1 | 1 | 1 | 0 | 0 | 0 |
| Sugar Beet | 1 | 2 | 2 | 3 | 3 | 3 | 3 | 0 | 3 | 1 | 2 | 2 | 3 | 0 | 0 | 0 |
| Foxtail | 2 | 3 |   | 3 | 3 | 3 | 3 |   |   | 2 |   |   | 3 |   |   |   |
| Crab Grass | 3 | 3 | 3 | 3 | 3 | 3 | 3 | 2 | 3 | 3 | 3 | 3 | 3 | 0 | 0 | 0 |
| Pigweed | 3 | 3 | 3 | 3 | 3 | 3 | 3 | 2 | 3 | 3 | 3 | 3 | 3 | 0 | 0 | 0 |
| Soybean | 0 | 0 | 3 | 0 | 3 | 3 | 1 |   |   | 0 |   |   | 3 | 0 | 0 | 0 |
| Wild Buckwheat | 3 | 3 | 0 | 3 | 3 | 3 | 3 | 0 | 3 | 2 | 2 | 3 | 3 | 0 | 0 | 0 |
| Tomato | 3 | 1 | 0 | 1 | 2 | 2 | 2 | 0 | 3 | 0 | 3 | 1 | 2 | 0 | 0 | 0 |
| Sorghum | 1 | 3 | 2 | 3 | 3 | 3 | 3 | 2 | 3 | 3 | 3 | 1 | 3 | 0 | 0 | 0 |
| Barnyard Grass |   |   | 3 |   |   |   |   | 3 | 3 |   | 3 | 3 |   |   |   |   |

[1] 3 Severe phytotoxicity.
2 Moderate phytotoxicity.
1 Slight phytotoxicity.
0 No phytotoxicity.

TABLE II.—EXTENT [1] OF PHYTOTOXICITY EMPLOYING COMPOUND

| Plant | A | B | C | D | E | F | G | H | I | J | K | L | M | Q |
|---|---|---|---|---|---|---|---|---|---|---|---|---|---|---|
| Morning Glory | 0 | 0 | 0 | 0 | 1 | 0 | 0 | 0 | 0 | 0 | 0 | 0 | 0 | 0 |
| Wild Oat | 0 | 0 | 0 | 0 | 2 | 1 | 0 | 0 | 0 | 0 | 3 | 0 | 0 | 0 |
| Brome Grass | 0 | 0 | 0 | 0 | 0 | 0 | 3 | 0 | 0 | 0 | 1 | 0 | 0 | 0 |
| Rye Grass | 0 | 0 | 0 | 0 | 3 | 0 | 0 | 0 | 0 | 0 | 3 | 0 | 0 | 0 |
| Radish | 0 | 0 | 0 | 0 | 0 | 0 | 0 | 0 | 0 | 0 | 0 | 0 | 0 | 0 |
| Sugar Beet | 0 | 0 | 0 | 0 | 3 | 0 | 0 | 0 | 2 | 0 | 1 | 0 | 0 | 0 |
| Foxtail |   |   |   | 0 | 3 | 2 | 1 |   |   | 0 |   |   | 2 | 0 |
| Crab Grass | 0 | 0 | 0 | 0 | 3 | 3 | 2 | 3 | 3 | 0 | 3 | 2 | 3 | 0 |
| Pigweed | 0 | 0 | 0 | 0 | 0 | 0 | 1 | 0 | 1 | 0 | 3 | 3 | 2 | 0 |
| Soybean | 0 | 0 | 0 | 0 | 0 | 0 | 0 |   |   | 0 |   |   | 0 | 0 |
| Wild Buckwheat | 0 | 0 | 0 | 0 | 1 | 0 | 0 | 0 | 1 | 0 | 0 | 0 | 0 | 0 |
| Sorghum | 0 | 0 | 1 | 0 | 1 | 0 | 0 | 0 | 0 | 0 | 1 | 0 | 0 | 0 |
| Barnyard Grass | 0 | 0 |   | 0 |   |   |   | 1 | 2 | 0 | 3 | 2 |   | 0 |
| Corn | 0 | 0 | 0 | 0 |   |   |   | 0 | 0 |   | 0 | 0 |   | 0 |

[1] 3 Severe phytotoxicity.
2 Moderate phytotoxicity.
1 Slight phytotoxicity.
0 No phytototoxicity.

From the foregoing evaluation data it is apparent that the N-substituted tolylacetamides are effective pre-emergence herbicides at the 25 lbs. per acre level of application (Table I), and at the 5 lbs. per acre level of application (Table II) unusual specific activity with respect to crab grass is evident. At the higher level of application the selective activity is not as pronounced, some of the broad leaf plants being at times inhibited. These data demonstrate that the presence of at least one aliphatic hydrocarbon radical on the amide nitrogen is critical, and that not just any aryl radical attached to the alpha-carbon of the acetamide nucleus will provide an arylacetamide having herbicidal activity. These data (Table II) also demonstrate the outstanding pre-emergence herbicidal properties of the preferred compounds of this invention, namely the N-substituted 2-(o-tolyl)acetamides and the N-substituted 2-(m-tolyl)acetamides, particularly the latter, at low levels of application.

From the above tables of data it will be evident that the herbicidal action of the N-substituted tolylacetamides of this invention are unusual, since near homologs not within the scope of this invention are relatively useless as herbicides. Valuable herbicidal effects will be observed by applications of small amounts, for example, as low as 1 lb. of active component per acre as well as high concentrations, for example 100 lbs. per acre. The selective activity on grasses is exhibited at lower rates of application, for example from 2 to 15 lbs. per acre. For general application and herbicidal effect on both the grasses and dicotyledonous plants, it will be found necessary to use from 10 to 50 lbs. per acre.

Selective herbicidal activity with respect to several genera of grasses is illustrated by the data in the above tables. Other experiments run with respect to plants of different genera, which have different metabolisms and physical characteristics indicate little or no inhibition of growth. The three botanical types, or genera, of grasses which are effectively controlled by means of the tolylacetamides of this invention, embrace a large number of undesirable plants, or weeds, frequently found in vegetable crops. This invention is not limited to removing grasses from broad leaf plants since the selective activity will be useful in removing weeds from corn, which belongs to a different genus of grass. Many other crops and particularly the broad leaved plants are inhibited by weeds of the wild oat, crab grass and rye genera, which can be effectively controlled by the practice of this invention. In some instances there are minor herbicidal effects on dicotyledonous plants, and therefore optimum results may depend to some extent on experience with respect to the activity of the particular N-substituted tolylacetamide on the vegetable crop to be treated.

As demonstrated above, unusual grass specificity can be achieved at lower levels of application, whereas at higher levels of application, the N-substituted tolylacetamide exhibit a more general herbicidal effect. This provides another and quite different utility in the removal of plants of a large number or all botanical genera. It will be apparent that quite different effects can be obtained by modifying the method of use. For this reason an essential part of this invention is the formulation so as to permit a uniform predetermined application of herbicide to soil surfaces so as to produce the desired effect. By proper selection and proportioning of the various conditioning agents either liquid or solid formulations can be prepared, and so as to adapt the herbicide for achieving the desired result with any conventional device for treating plant or soil surfaces.

Although the tolylacetamides of this invention are useful per se in controlling a wide variety of plant growth, it is preferable that they be supplied to the plant growing medium in a dispersed form in a suitable extending agent.

In the instant specification and appended claims it is to be understood that the term "dispersed" is used in its widest possible sense. When it is said that the tolylacetamides of this invention are dispersed, it means that the particles of the tolylacetamides of this invention may be molecular in size and held in true solution in a suitable organic solvent. It means further that the particles may be colloidal in size and distributed throughout a liquid phase in the form of suspensions or emulsions or in the form of particles held in suspension by wetting agents. The term "dispersed" also means that the particles may be mixed with and distributed throughout a solid carrier providing a mixture in particulate for, e.g., pellets, granules, powders, or dusts.

In the instant specification and appended claims it is to be understood that the expression "extending agent" includes any and all of those substances in which the tolylacetamides of this invention are dispersed. It includes therefore, the solvents of a true solution, the liquid phase of suspensions, or emulsions and the solid phase of particulate solids, e.g. pellets, granules, dusts and powders.

The exact concentration of the tolylacetamides of this invention employed in combatting or controlling noxious vegetation can vary considerably provided the required dosage (i.e. herbicidal amount) thereof is supplied to the plant growing medium. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared herbicidal spray or particulate solid. In such a concentrate composition, the N-substituted tolylacetamide generally will be present in a concentration of 5 to 95 percent by weight, the residue being any one or more of the well-known herbicidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the tolylacetamides of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., and having a flash point above about 80° F., particularly kerosene), mineral oils and the like.

The tolyl acetamides of this invention are preferably supplied to the plant growing medium in the form of emulsions or suspensions. Emulsions or suspensions are prepared by dispersing the tolylacetamide of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition page 280). These surfactants include the well-known capillary active substances which may be anion-active (or anionic), cation active (or cationic), or non-ionizing or (non-ionic) which are described in detail in volume I and II of Schwartz, Perry and Berch's "Surface Active Agents and Detergents" (1958 Interscience Publishers, Inc., New York), and also in the November 1947 issue of Chemical Industries (pages 811–824) in an article entitled "Synthetic Detergents" by John W. McCutcheon and also in the July, August, September and October, 1952 issues of Soap and Sanitary Chemicals under the title "Synthetic Detergents." The disclosures of these articles with respect to surfactants, i.e. the anion-active, cation-active and non-ionizing capillary active substances, are incorporated in this specification by reference in order to avoid unnecessary enlargement of this specification. The preferred surfactants are the water-soluble anionic surface-active agents and the water-soluble non-ionic surface-active agents set forth in U.S. 2,846,398 (issued August 5, 1958). In general it is preferred that a mixture of water-soluble anionic and water-soluble non-ionic surfactants be employed.

The tolylacetamides of this invention can be dispersed by suitable methods (e.g. tumbling or grinding) in solid extending agents either of organic or inorganic nature and supplied to the plant growing medium in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials and include for example, such materials of organic nature as powdered cork powdered wood, and powdered walnut shells. The preferrd solid carriers are the adsorbent clays, e.g. bentonite. These mixtures can be used for herbicidal purposes in the dry form, or by addition of water-soluble surfactants or wetting agents the dry particulate solids can be rendered wettable by water so as to obtain stable aqueous dispersions or suspensions suitable for use as sprays.

In all of the forms described above the dispersions can be provided ready for use in combatting noxious vegetation or they can be provided in a concentrated form suitable for mixing with or dispersing in other extending agents. As illustrative of a particularly useful concentrate is an intimate mixture of tolylacetamide of this invention with a water-soluble surfactant which lowers the surface tension of water in the weight proportions of 0.1 to 15 parts of surfactant with sufficient of the tolylacetamide of this invention to make 100 parts by weight, such a concentrate is particularly adapted to be made into a spray for combatting various forms of noxious vegetation by the addition of water thereto. As illustrative of such a concentrate is an intimate mixture of 95 parts by weight of N,N-dimethyl 2-(m-tolyl) acetamide and 5 parts by weight of a water-soluble non-ionic surfactant such as the polyoxyethylene derivatives or sorbitan monolaurate.

Another useful concentrate adapted to be made into a spray for combatting noxious vegetation is a solution (preferably as concentrated as possible) of a tolylacetamide of this invention is an organic solvent therefor. The said liquid concentrate preferably contains dissolved therein a minor amount (e.g. 0.5 to 10 percent by weight of the weight of the new herbicidal agent) of a surfactant (or emulsifying agent), which surfactant is also water-soluble. As illustrative of such a concentrate is a solution of N,N-dimethyl 2-(o-tolyl)acetamide in benzene which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylary sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acide esters of sorbitan containing 15 to 30 moles of ethylene oxide per mole of sorbitan mono-ester of alkylphenol.

In all of the various dispersions described hereinbefore for herbicidal purposes, the active ingredient can be one or more of the compounds of this invention. The compounds of this invention can also be advantageously employed in combination with other pesticides, including, for example, nematocides, bacterocides, and insecticides. In this manner it is possible to obtain mixtures which are effective against a wide variety of pests and other forms of noxious life.

While this invention has been described with respect to certain embodiments, it is to be understood that it is not so limited and that variations and modifications thereof obvious to those skilled in the art can be made without departing from the spirit and scope thereof.

What is claimed is:
1. The method of selectively inhibiting the germination and pre-emergent growth of grasses from seeds in contact with soil, which comprises treating the said soil with an effective amount of an N-substituted tolylacetamide of the structure

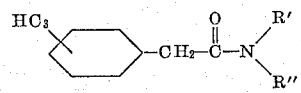

wherein R' is selected from the group consisting of hydrogen and lower aliphatic hydrocarbon radicals and wherein R'' is a lower aliphatic hydrocarbon radical.

2. The method of selectively inhibiting the germination and pre-emergent growth of grasses from seeds in contact with soil, which comprises treating the said soil with a herbicidal amount of an N-substituted tolylacetamide of the structure

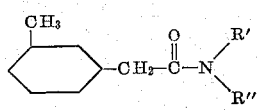

wherein R' and R'' are aliphatic hydrocarbon radicals containing from 1 to 3 carbon atoms.

3. The method of selectively inhibiting the germination and pre-emergent growth of grasses from seeds in contact with soil, which comprises treating the said soil with a herbicidal amount of an N-substituted tolylacetamide of the structure

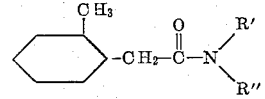

wherein R' and R'' are aliphatic hydrocarbon radicals containing from 1 to 3 carbon atoms.

4. The method of selectively inhibiting the germination of pre-emergent growth of grasses from seeds in contact with soil, which comprises treating the said soil with a herbicidal amount of N,N-dimethyl 2-(m-tolyl)acetamide.

5. The method of selectively inhibiting the germination and pre-emergent growth of grasses from seeds in contact with soil, which comprises treating the said soil with a herbicidal amount of N,N-dimethyl 2-(o-tolyl)acetamide.

References Cited by the Examiner
UNITED STATES PATENTS

| | | | |
|---|---|---|---|
| 2,412,510 | 12/1946 | Jones | 71—2.6 |
| 2,841,589 | 7/1958 | Brandstrom et al. | 260—294 |
| 3,006,918 | 10/1961 | de Johgh et al. | 260—250 |
| 3,187,041 | 6/1965 | Richter | 71—2.6 X |

OTHER REFERENCES

Pizey et al., J. Sci. Food Agric., vol. 10, No. 11, Nov. 10, 1959, pages 577 to 584.

LEWIS, GOTTS, *Primary Examiner.*
JAMES O. THOMAS, *Examiner.*
JULIAN LEVITT, *Assistant Examiner.*